United States Patent [19]

Grulick

[11] Patent Number: 5,729,966
[45] Date of Patent: Mar. 24, 1998

[54] METHOD OF MARKING OPTICAL FIBER LAY DIRECTION REVERSAL POINTS ON CABLE JACKETS

[75] Inventor: Matthew J. Grulick, Hickory, N.C.

[73] Assignee: Siecor Corporation, Hickory, N.C.

[21] Appl. No.: 675,201

[22] Filed: Jun. 28, 1996

[51] Int. Cl.[6] ............................................. G02B 6/44
[52] U.S. Cl. ............................. 57/293; 57/34; 385/147
[58] Field of Search ........................... 57/314, 293, 294, 57/204; 385/147, 100, 105

[56] References Cited

U.S. PATENT DOCUMENTS

| | | | |
|---|---|---|---|
| 3,589,118 | 6/1971 | Strelow et al. | 57/34 |
| 3,664,108 | 5/1972 | Strelow et al. | 57/34 AT |
| 4,224,788 | 9/1980 | Vogelsberg | 57/294 |
| 4,266,398 | 5/1981 | Vogelsberg | 57/293 |
| 4,309,864 | 1/1982 | Hulin | 57/6 |
| 4,359,857 | 11/1982 | Oestreich | 57/18 |
| 4,386,496 | 6/1983 | Oestreich | 57/293 |
| 4,429,521 | 2/1984 | Oestreich | 57/294 |
| 4,828,352 | 5/1989 | Kraft | 350/96.23 |
| 4,960,318 | 10/1990 | Nilsson et al. | 350/96.23 |
| 5,042,904 | 8/1991 | Story et al. | 385/105 |
| 5,119,464 | 6/1992 | Freychet et al. | 385/147 |
| 5,379,363 | 1/1995 | Bonicel et al. | 385/147 X |
| 5,498,145 | 3/1996 | Sikora et al. | 425/71 |

FOREIGN PATENT DOCUMENTS

46-38748  11/1971  Japan.

*Primary Examiner*—John P. Darling
*Assistant Examiner*—Tina R. Taylor

[57] ABSTRACT

Methods for marking sections of a fiber optic cable (22) so that carrier tube reversal points will be indicated on an exterior surface of the fiber optic cable. The method including the steps of: determining a current length value of the cable; measuring an offset distance value (39), the offset distance being a length measurement between a carrier lay direction reversal point of the cable and a marking device (28); entering the offset distance value into a memory; as a lay direction reversal point is being made, adding the current length value to the offset distance to define a sum value; comparing the sum value to the current cable length value; and when the sum value equals the current cable length value, activating the marking device (28) whereby the marking device marks the cable section.

15 Claims, 7 Drawing Sheets

METHOD OF MARKING OPTICAL FIBER LAY DIRECTION REVERSAL POINTS ON CABLE JACKETS

BACKGROUND OF THE INVENTION

This invention relate to telecommunication cables which incorporate optical fiber buffer tubes or other carriers which are stranded with a lay which reverses directions at periodic interals. Such cables are often referred to as "S-Z stranded", as the opposing directions of the letters S and Z suggest the two different directions of lay.

Various S-Z stranding methods have been practiced in the production of electrical telecommunication cables and optical telecommunication cables. Descriptions of such methods and devices are to be found in the prior art, such as in U.S. Pat. Nos. 4,266,398, to Vogelsberg; and 4,359,852, 4,386, 496 and 4,429,521, to Oestreich, among others. S-Z stranded tubes containing optical fibers are herein called buffer tubes. Such buffer tubes may contain optical fibers or optical fiber ribbons.

Electrical conductors are ductile and can withstand sharp lateral and tensile forces. In contrast, optical fibers are comparatively fragile. Therefore, some S-Z stranding methods are useful in stranding electrical conductors, but not optical fiber buffer tubes. If both electrical conductors and buffer tubes are stranded in the same cable, the stranding design is based on the necessity of avoiding damage to the optical fibers. The electrical conductors and buffer tubes may be stranded at different points on the passline. The axis of the route traveled by the cable during its manufacture may be called the passline.

If a cable jacket is removed in the neighborhood of a lay direction reversal point (switchback), a section of stranded buffer tube including a reversal point may be unwound from the core, and the optical fibers within such unwound section then may be more easily accessed for fiber splicing or other network operations. This midspan access may not occur until years after the installation of the cable. However, the cable exterior tube, called the sheath or jacket, typically is colored black in order to protect the interior of the cable from long-term exposure to sunlight. Thus, a craftsperson was unable to determine the precise locations of lay direction reversal points, called switchbacks, until the jacket was breached. As a result, the jacket disadvantageously had to be longitudinally slit from the point of the initial jacket entry to a switchback location. A slit which is longer than necessary increases the risks of disturbance or damage to other cable components and of moisture ingress through the opened section of the jacket.

U.S. Pat. No. 4,828,352, to Kraft, disclosed optical fiber cables including an indicator such as a word or symbol on a sheath, such as the outer jacket, circumscribing a core including S-Z stranded buffer tubes. The indicator is placed at the location of a switchback point. Incorporated by reference in the '352 patent was U.S. Pat. No. 3,823,536, Vogelsberg et al. The '536 patent describes a method of making a S-Z twisted electrical cable in which the conductors are formed into a strand and stretched between first and second twisting points. The torsions at the twisting points can be changed to vary the intervals between lay reversal points; this is accomplished by motor 61 which drives the first twisting head and also drives the second twisting head through magnetic clutches 70, 69.

Japanese laid-open patent application no. 46-38748 disclosed a particular method for manufacturing a self-supporting aerial cable incorporating S-Z stranded electrical conductors, and discloses means including a slitting pin for perforating the web connecting the cable and the messenger. By selecting an interval between the twisting die and the pin, the remaining web portions are placed over the lay direction reversal portions $P_1$ and $P_2$.

JP 46-38748 does not disclose how to indicate lay direction reversal points when separate stranding and jacking lines are to be used. Space or other limitations often require the use of separate stranding and jacketing lines. Moreover, a slitting pin would not be used in manufacturing unless the web were present. Even when making Figure-8 type cables as described, the slitting pin likely would become caked with cooling polymer material and cause excessive tearing, impairing the function of the messenger. System recalibration would be required if the relative positions of the line components were changed.

Manufacturing line systems in which downstream moving elements are mechanically linked to upstream lay plates which rotate in alternate directions are inherently somewhat expensive to build and maintain.

SUMMARY OF THE INVENTION

An object of the present invention therefore is to provide improved methods and apparatus for applying indicia on the sheath of a cable, such indicia being substantially transversely co-extensive with lay direction reversal points of optical fiber buffer tubes disposed within the cable sheath. Such indicia, such as words or symbols, are especially useful in locating switchbacks in optical fiber cable buffer tubes. The word "indicia" includes the use of a single marking.

Another object of the present invention is to provide a sheath marking apparatus whose operation is responsive to variations in lay length experienced during actual buffer tube stranding, and is not subject to the limitations of mechanically linked systems.

Still another object of the invention is to provide methods for providing the sheath marking when separate stranding and jacketing lines are used.

These and other objects are provided, according to the present invention, by a manufacturing apparatus and method for supplying the desired markings on the sheath of a continuously moving cable which comprises the S-Z stranded buffer tubes each containing one or more optical fibers. Optical fibers within a tube may be incorporated into ribbons or bundles. The optical fiber or fibers may be either movably disposed or tightly embedded within the stranded tubes. Such tubes are sometimes called buffer tubes.

In a first embodiment of the invention, the apparatus and method is practiced in the environment of a combined cable core stranding and jacketing line. In a typical prior art combined cable core stranding and jacketing line, a plurality of tubes are S-Z stranded, for example about a central member, in accordance with any of a variety of known methods. The tubes have lay direction reversal points which are spaced apart from one another. A central member may be drawn through the axial bore of at least one lay plate which is driven to rotate about the passline successively first in one direction and then in the opposite direction in response to a lay direction reversal signal generated in the line control system. The lay plate or plates are used to S-Z strand the tubes about the central member. The central member may pass through a hollow tube, sometimes called an accumulator, passing through the axial bore in each lay plate and having a smooth outer surface along which the tubes may pass. Binder yarns or tapes, tensile strength members, and other desired cable components may then be laid over the stranded tubes to complete the cable core. An extruder crosshead thereafter forms a tubular sheath about the core, and the sheath is thereafter cooled by passing through a water trough and the cable is drawn onto a rotating take-up reel.

The point on the passline at which the location of each buffer tube lay direction reversal point becomes stable, not subject to subsequent substantial shifting along the core, may be determined by observation. This point is herein called the "fix point". In lines utilizing one or more driven lay plates, the fix point is located a very short distance downstream along the passline from the last lay plate twisting die. This lay plate twisting die is an annular device guiding the tubes onto the core. Of course, a fix point may also be determined on manufacturing lines using other S-Z stranding methods.

In an improved combined stranding and jacketing line according to the invention, a sheath marker is provided adjacent to the passline between the water trough and the take-up reel. An offset distance which separates the sheath marker and the fix point is measured. This offset distance is entered into a computer memory. A cable length measurement device, called a length counter, is placed on the line. If the cable includes a central member, the length counter preferably is placed on the central member just downstream of the central member pay-off reel. However, the length counter may be placed at any convenient location adjacent to the passline either upstream or downstream of the sheath extruder crosshead. The length counter generates a pulse train which is sent to the computer memory. The computer monitors the pulse train to determine the cable length currently passing the length counter, herein called the current length. Responsive to changes in the direction of rotation of the downstream lay plate, an encoder generates an encoder signal which is sent to the computer memory. Upon receipt of the encoder signal, the computer adds the cable current length to the offset distance and enters the sum as a value into a FIFO (first in, first out) shift register.

A comparator determines whether the cable current length is equal to the first sum in the FIFO register queue. When it is, the computer transmits a signal to the sheath marker. Responsive to this signal, the sheath marker then marks a switchback location by placing indicia on the sheath. The computer then indexes the FIFO shift register to the next sum in the register, dropping the previous first sum.

Other manufacturing lines may utilize other apparatus, such as a counter-rotating accumulator, for S-Z stranding. The encoder or other signal may be emitted in response to a change in the direction of a lay plate, accumulator, or other apparatus as most particularly suited to the manufacturing line being used.

In a second embodiment of the invention, separate stranding and jacketing lines are used. In a typical prior art stranding line, a layer of tubes is S-Z stranded, for example about a central member, in accordance with any of a variety of known methods. A central member may be drawn through the axial bore of at least one lay plate which is driven to rotate in succession first in one direction and then in the opposite direction in response to a lay direction reversal signal generated in the line control system. The lay plate or plates are used to S-Z strand the tubes about the central member. Binder yarns or tapes, tensile strength members, and other desired cable components may then be laid over the tubes to complete the cable core. The core is then drawn onto a core take-up reel. In a separate jacketing line, an extruder crosshead forms a tubular sheath over the core, and the sheath is thereafter cooled by passing through a water trough and the cable is drawn onto a rotating take-up reel.

The stranding line of the second embodiment includes a core marker apparatus located between the fix point on the core and the core take-up reel. As in the first embodiment, an offset distance which separates the core marker and the fix point on the core is measured and sent to a computer memory. A length counter generates a pulse train which also is sent to the computer memory. The computer monitors the pulse train to determine the core current length. Responsive to changes in the direction of rotation of the downstream lay plate, an encoder generates an encoder signal which is sent to the computer memory. Upon receipt of the encoder signal, the computer adds the core current length to the offset distance and enters the value of the sum into a FIFO (first in, first out) shift register.

A comparator determines whether the cable current length is equal to the first sum in the FIFO register queue. When it is, the computer transmits a signal to the core marker. Responsive to this signal, the core marker then marks a switchback location indicia on the core. The computer then indexes the FIFO shift register to the next sum in the register, dropping the previous first sum.

In an improved jacketing line according to the second embodiment of the invention, a sheath marker is provided between the water trough and the take-up reel. A sensor for sensing the core indicia and generating a signal responsive to such sensing is located between the core pay-off reel and the extruder crosshead forming the sheath. An offset distance which separates the sensor and the sheath marker is measured. A length counter is placed adjacent to the passline, preferably just downstream of the core pay-off reel. The length counter generates a pulse train. The sensor signals and the length counter pulse train are directed to a jacketing line computer. Whenever a sensor signal is received, the computer adds the current core length to the offset distance and the sum is entered into a FIFO register.

Whenever a comparator determines that the current cable length is equal to the first sum in the register, the computer transmits a signal to the sheath marker, which marks a switchback location by placing indicia on the sheath.

In a third embodiment of the invention, separate stranding and jacketing lines also are used. No change is made to a typical prior art stranding line, and no intermediate core indicia are applied. Instead, the jacketing line includes machine vision apparatus to detect the tube lay direction reversal points directly. In other respects, the jacketing line of the third embodiment of the invention and its method of operation are the same as the jacketing line of the second embodiment of the invention and its method of operation.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

For each preferred embodiment, a system for practicing the invention may be incorporated into manufacturing line control systems. However, for simplicity, the invention according to each embodiment will be described herein as directed by one or more separate computers which are in communication with a prior art line control system.

In each embodiment herein, the core or external sheath to be marked is continuously moving.

Figure 1:
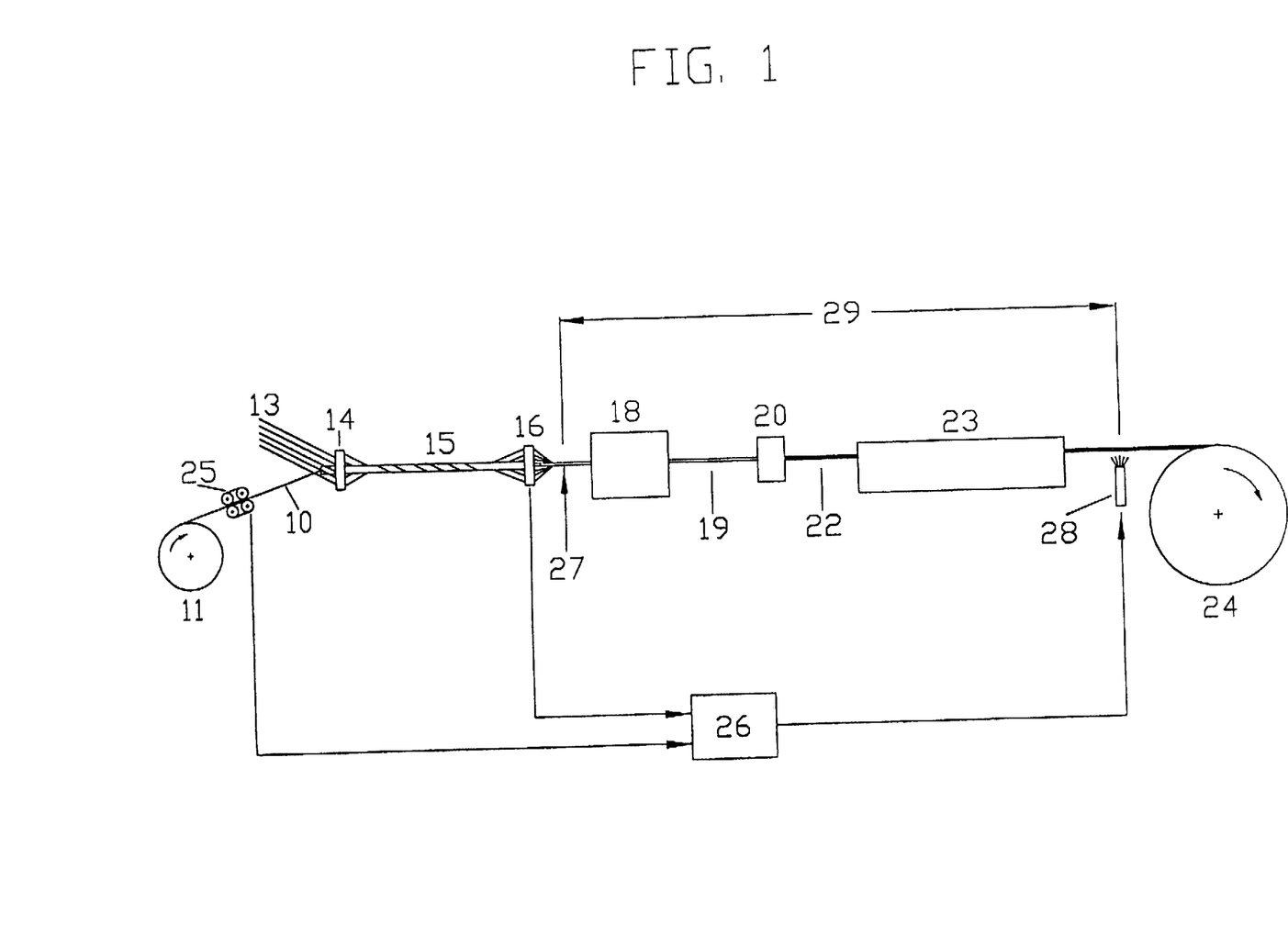
FIG. 1 is a schematic view of a combined stranding and jacketing line according to the first embodiment of the invention.

A schematic view of a combined stranding and jacketing line according to the first embodiment of the invention is shown in FIG. 1. Central member 10 is payed off from reel 11 and passes against a length counter 25. Central member 10 then proceeds through a central opening in lay plate 14 and through a central bore in accumulator 15. Tubes 13, which in this instance contain optical fibers movably disposed therein, are payed off from an array of buffer tube pay-off reels (not shown). Tubes 13 alternately may contain optical fiber ribbons. Tubes 13 each pass through an opening in lay plate 14, such openings being arranged in a circular array near the outer periphery of lay plate 14. A lay plate 16 located at the downstream end of accumulator 15 is conventionally driven in response to a lay plate signal generated by a conventional line control system so as to repeatedly rotate alternately in one direction and then in the other direction. As lay plate 16 rotates, tubes 13 are wrapped in various configurations about the smooth outer surface of accumulator 15. One or more mediate lay plates, driven or nondriven, may be disposed between lay plates 14 and 16 to provide for smooth operation and to keep tubes 13 from becoming entangled with each other in the vicinity of accumulator 15. In the system described, accumulator 15 is fixed, but other systems may include a rotating accumulator.

As central member 10 emerges from the interior of accumulator 15, tubes 13 pass through an array of holes in lay plate 16 and are driven by the oscillating motion of lay plate 16. Tubes 13 thus are wrapped in S-Z fashion with a lay that periodically changes hand around central member 10. A collecting die may be placed near the downstream side of lay plate 16. To ensure that S-Z stranded buffer tubes 13 do not unravel, one or more binder tapes preferably are wrapped by binder apparatus 18 over buffer tubes 13 to form core 19. If two binder tapes are used, they may be wrapped having opposite directions of lay. For S-Z stranded optical fiber cables, more than one complete helix of a binder typically is created over each unidirectional stranding interval.

Core 19 is then pulled through extruder crosshead 20, which applies a sheath 21 (see FIG. 7) of plastic material around the core to form cable 22. Cable 22 is cooled by circulating water in trough 23 and is taken up on reel 24.

Figure 2:
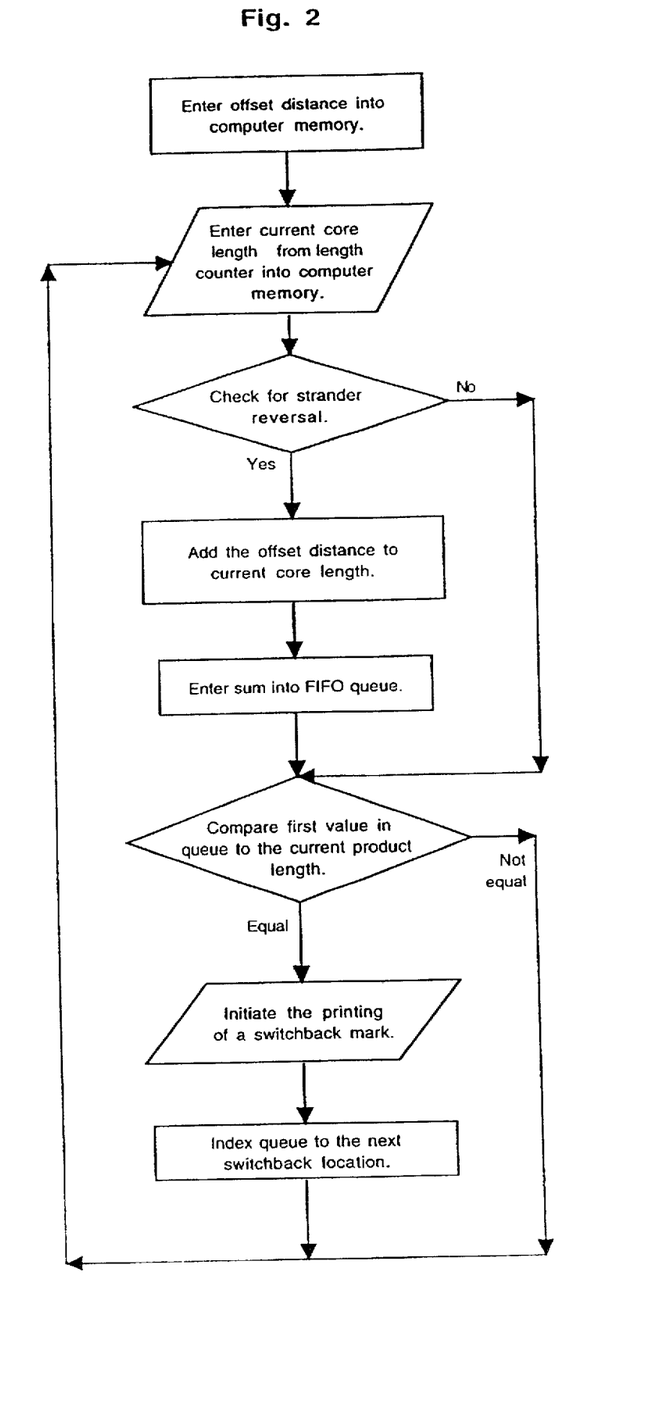
FIG. 2 is a flowchart of processing steps practiced in the first embodiment of the invention.

With reference to FIG. 1 and to the flow diagram of FIG. 2, a sheath marking system according to the first embodiment will now be described. The operator determines, by observation or experience, a fix point 27 at which the lay direction reversal points, or switchbacks, first become stably established in the core. The fix point should be determined for each individual manufacturing line. The exact location of the fix point depends on the type of equipment used, its age and peculiarities, and also may depend on the components of the cable being stranded, such as the buffer tube outer diameter. A jacket marker apparatus 28 is disposed between trough 23 and take-up reel 24. The offset distance 29 between fix point 27 and jacket marker apparatus 28 is measured and provided to computer 26.

The length counter 25 generates a pulse train which is sent to computer 26. Computer 26 monitors the pulse train to determine the current core length. This length also is typically shown by conventional line control systems on a display visible to the machine operator, and the length information may be routed to computer 26 either directly or from the conventional line control system acting as an intermediary.

Lay plate 16 reverses its direction of rotation as controlled by a conventional line control system. An encoder mounted to lay plate 16 transmits encoder signals, each corresponding to a direction reversal of lay plate 16, which encoder signals are sent to computer 26. Responsive to an encoder signal, computer 26 adds the offset distance 29 to the current core length, and places the sum into a first-in, first out (FIFO) date memory or shift register queue.

Computer 26 includes a comparator which compares the current core length and the first sum in the FIFO queue. If they are equal, a signal is sent to jacket marker apparatus 28. Responsive to this signal, jacket marker apparatus 28 places indicia 30 (FIG. 7) on the outer surface of jacket 21. The date memory or shift register is then indexed to the next sum contained therein, and the previous sum is dropped. Indicia 30 thus are applied substantially transversely co-extensive with a switchback location passing jacket marker 28.

The register holding the calculated sums must be large enough to hold the maximum number of switchbacks which may be present between the fix point 27 and jacket marker 28. This maximum number will be a function of the spacing between buffer tube switchbacks and the offset distance 29.

The length counter 25 may be a Quadratrak sold by Beta Instruments, Inc. See United Kingdom Patent GB 2154000. A length counter in any preferred embodiment herein may be incorporated into a cable pulling device. Computer 26, including the comparator, may be a model CQM1 sold by Omron Electronics, Inc. Jacket marker 28 may be a Valvemate Spray System sold by EFD of East Providence, RI.

Figure 3:
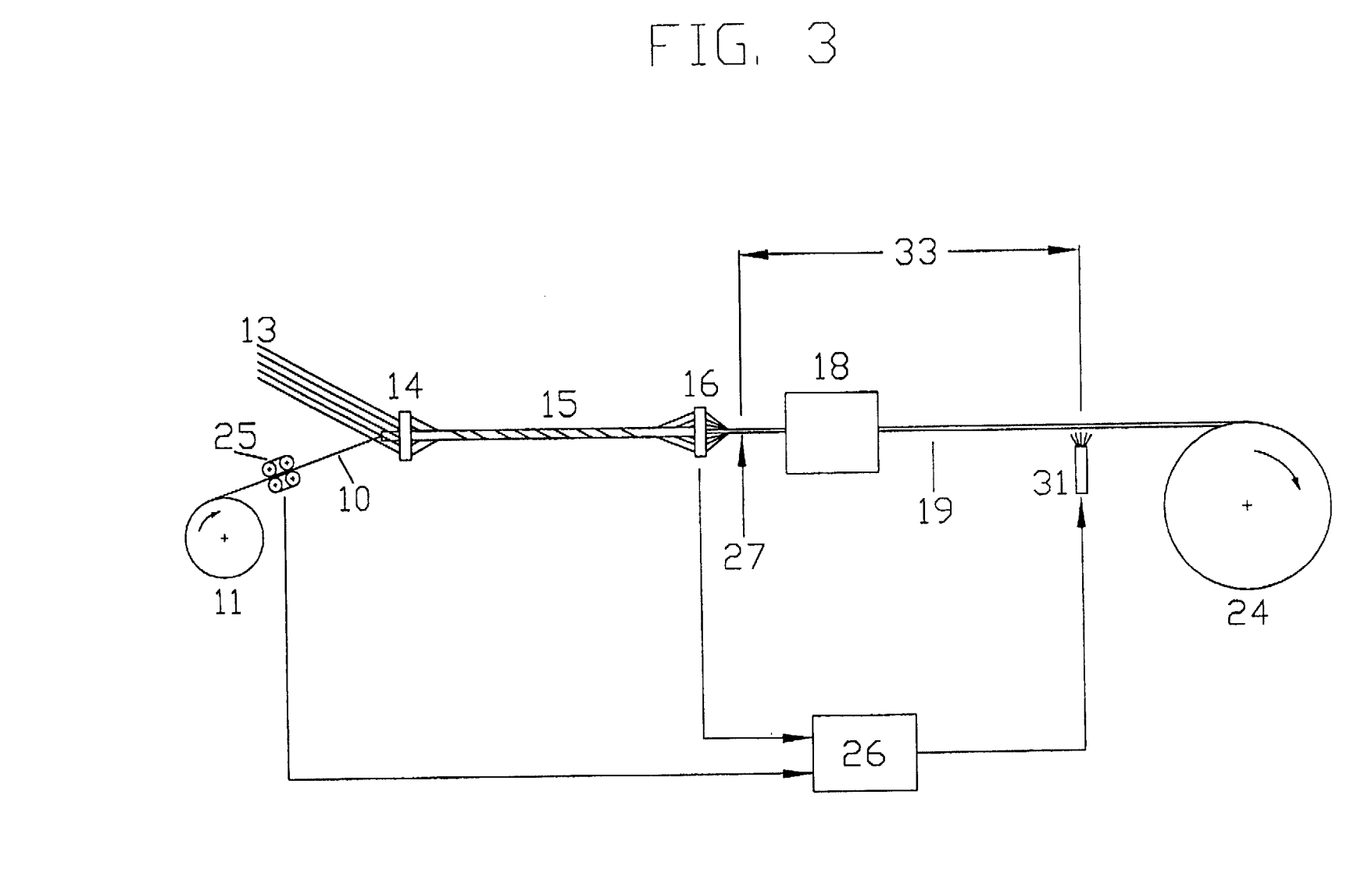
FIG. 3 is a schematic view of a stranding line according to the second embodiment of the invention.

A schematic view of a portion of a stranding line according to the second embodiment of the invention is shown in FIG. 3. Also refer to the flowchart in FIG. 5 with reference to the discussion of FIGS. 3 and 4. Core 19 is manufactured in the same; manner as practiced in the first embodiment of the invention and shown in FIG. 1.

The operator determines, by observation or experience, a fix point 27 at which the lay direction reversal points, or switchbacks, become established in the core. A core marker apparatus 31 is disposed between binder apparatus 18 and take-up reel 24. The offset distance 33 between fix point 27 and core marker apparatus 31 is measured and provided to computer 26. The length counter 25 generates a pulse train which is sent to computer 26. Computer 26 monitors the pulse train to determine the current core length.

Lay plate 16 reverses its direction of rotation as controlled by a conventional line control system. An encoder mounted to lay plate 16 transmits encoder signals, each corresponding to a direction reversal of lay plate 16, which encoder signals are sent to computer 26. Responsive to an encoder signal, Computer 26 adds the offset distance 33 to the current core length, and places the sum into a first-in, first out date memory or shift register queue.

Computer 26 includes a comparator which compares the current core length and the first sum in the FIFO queue. If they are equal, a signal is sent to core marker apparatus 31. Responsive to this signal, core marker apparatus 31 places indicia 32 (FIG. 7) on the exterior of core 19. The date memory or shift register is then indexed to the next sum contained therein and the previous sum is dropped. A marking thus is applied substantially transversely co-extensive with a switchback location passing core marker 31. Core 19, bearing indicia 32, is then taken up on reel 24.

The register holding the calculated sums must be large enough to hold the maximum number of switchbacks which may be present between the fix point 27 and core marker 31. This maximum number will be a function of the offset distance 33 and the spacing between tube switchbacks.

Figure 4:
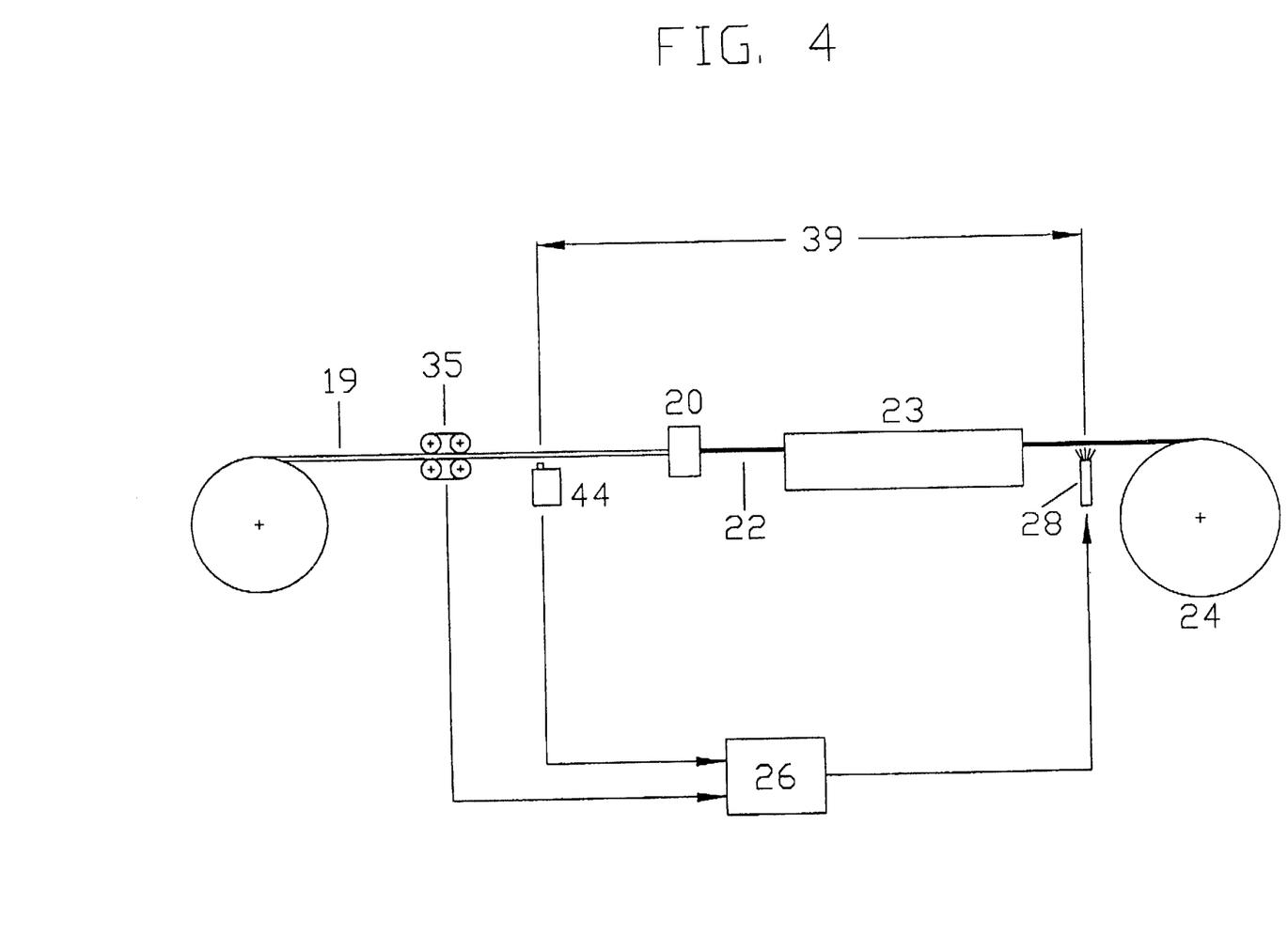
FIG. 4 is a schematic view of a jacketing line according to the second embodiment of the invention.
Figure 5:
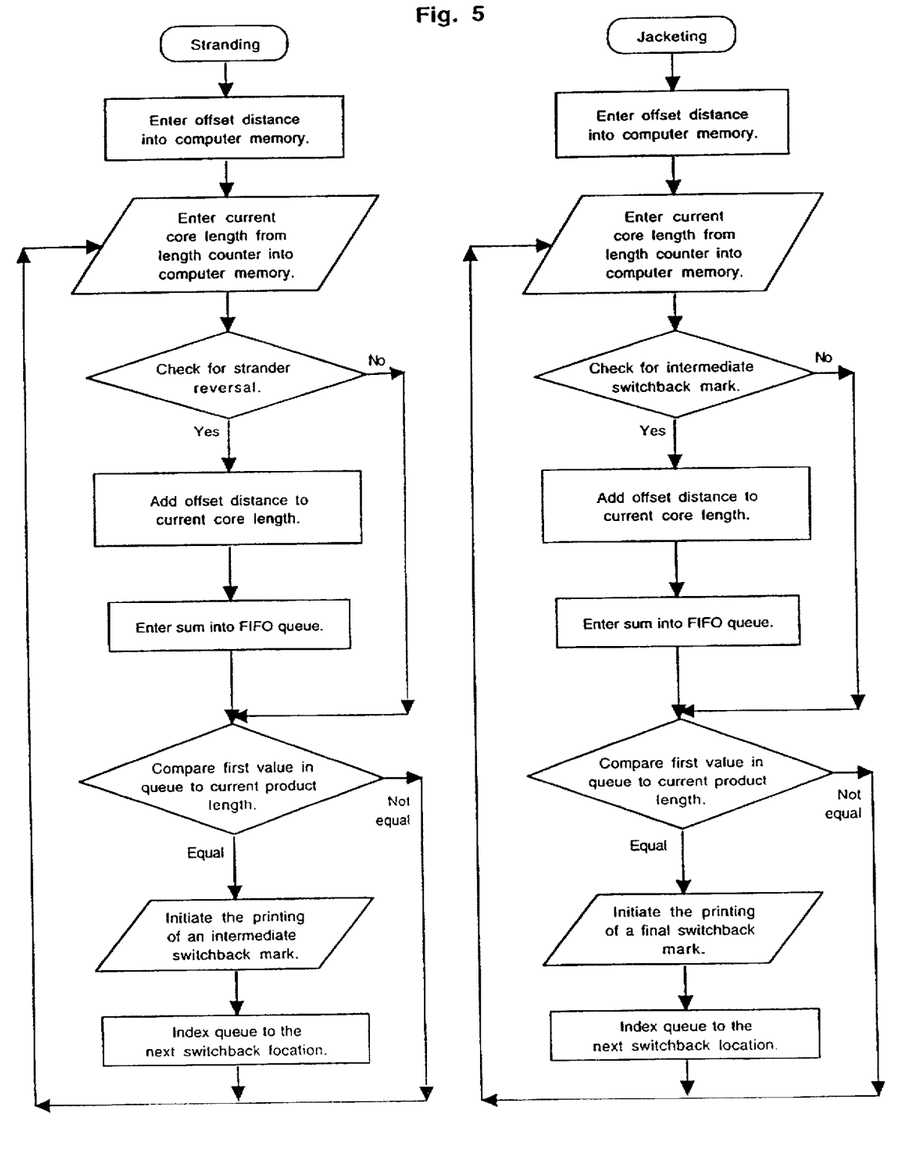
FIG. 5 is a flowchart of processing steps practiced in the second embodiment of the invention.

A jacketing line according to the second embodiment of the invention is shown in FIG. 4. Core 19 is payed off from a reel and passes adjacent to length counter 35. Core 19 passes thence adjacent to optical scan detector 44, which may be a color mark sensor. An example is Model SA1K sold by Idec Izumi Corporation, of Osaka, Japan, and Idec Corporation (USA) located in Sunnyvale, Calif. After passing optical scan detector 44, core 19 passes through an extruder crosshead 20 which applies a jacket to form cable 22. Cable 22 then passes through water trough 23 and passes adjacent to jacket marker 28, and is taken up on reel 24.

The offset distance 39 between optical scan detector 44 and jacket marker apparatus 28 is physically measured and provided to jacketing line computer 26. The offset distance need not be remeasured in subsequent operations unless changes in line operation make remeasurement necessary.

The length counter 35 generates a pulse train which is sent to computer 26. Computer 26 monitors the pulse train to determine the current core length. When optical scan detector 44 senses indicia 32 (see FIG. 7) a signal is sent to computer 26. Responsive to this signal, computer 26 adds the offset distance 39 to the current core length, and places the sum into a first-in, first out date memory or shift register queue.

Computer 26 includes a comparator which compares the current core length and the first sum in the FIFO queue. If they are equal, a signal is sent to jacket marker apparatus 28. See FIG. 7. Responsive to this signal, jacket marker apparatus 28 places indicia 30 on the outer surface of jacket 21. The date memory or shift register is then indexed to the next sum contained therein and the previous sum is dropped. Indicia 30 thus are applied substantially transversely co-extensive with a switchback location passing jacket marker 28.

The register holding the calculated sums must be large enough to hold the maximum number of switchbacks which may be present between the optical scan detector 44 and jacket marker 28. This maximum number will be a function of the spacing between buffer tube switchbacks and the offset distance 39.

Figure 6:
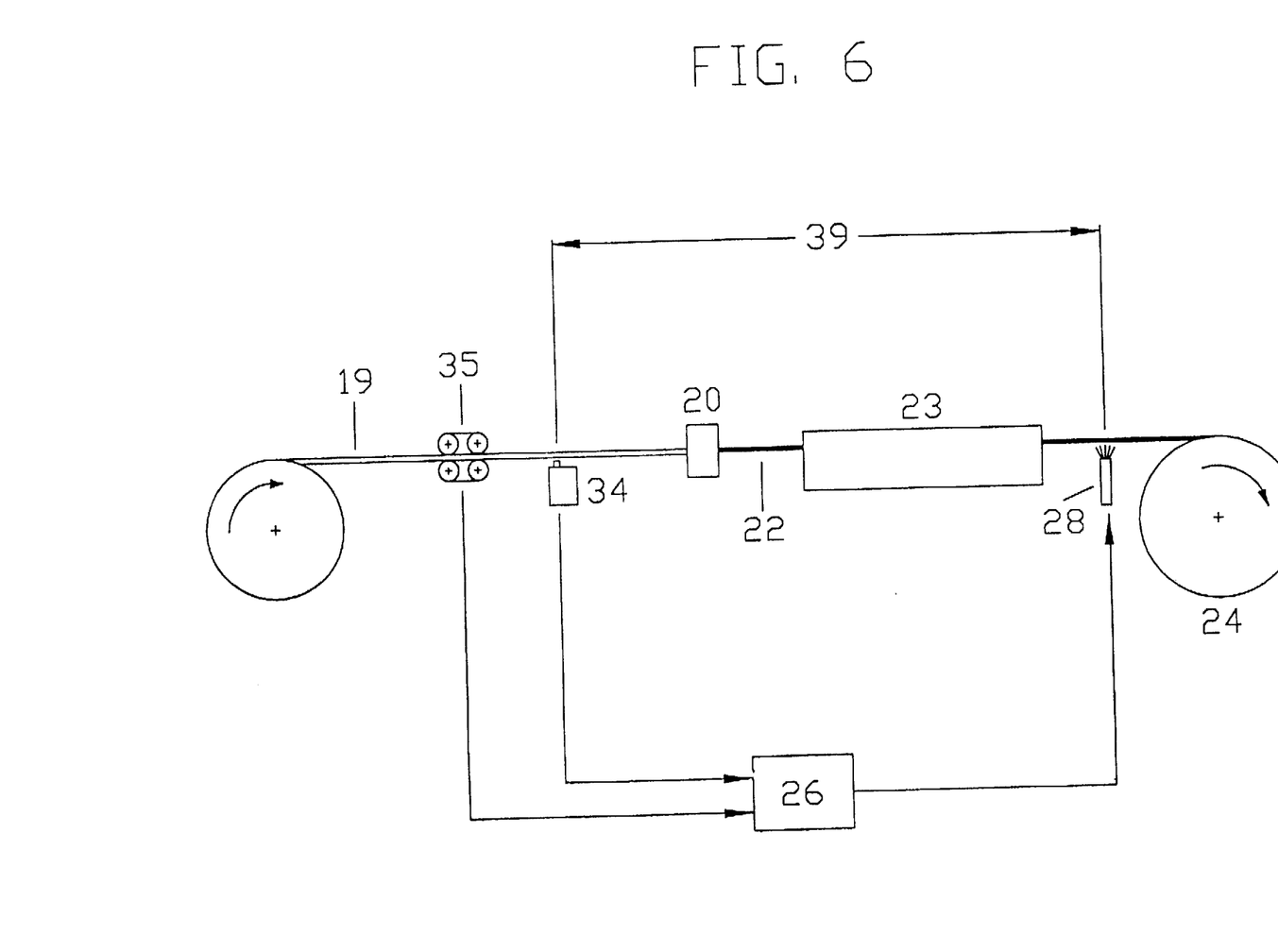
FIG. 6 is a schematic view of a jacketing line according to the third embodiment of the invention; and, FIG. 7 is a partial cutaway view of a cable marked according to the invention.

A prior art S-Z stranding line is used in conjunction with a jacketing line shown in FIG. 6 according to the third embodiment of the invention. A machine vision apparatus 34 is used to detect switchback locations without the aid of core markings. Upon such detection, a signal is sent to the jacketing line computer. Apart from the substitution of machine vision apparatus 34 for optical scan detector 44, the operation of the jacketing line of FIG. 6 is the same as the operation of the jacketing line of FIG. 4. The method of operation is the same as presented for jacketing in FIG. 5, except that a switchback is checked for instead of an intermediate switchback mark. Machine vision apparatus 34 may comprise a fluoroscope.

Figure 7:
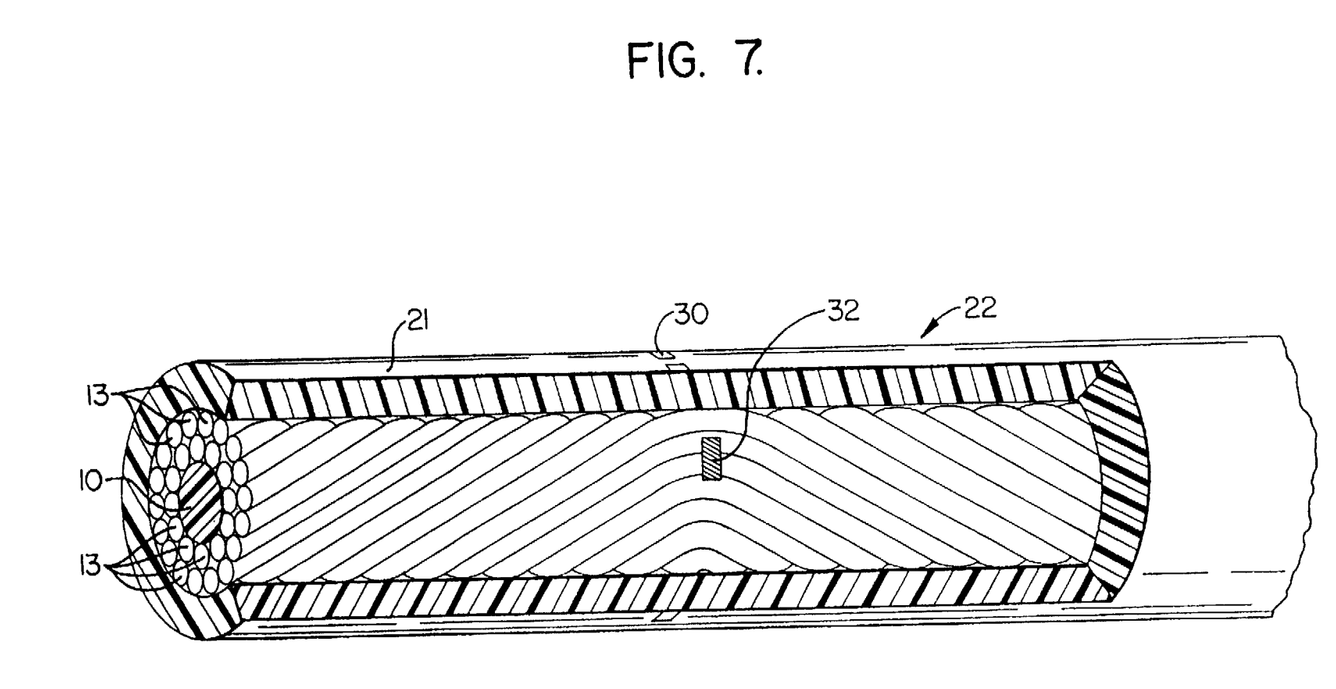

A cable marked according to the invention is shown in FIG. 7. A plurality of buffer tubes 13 are S-Z stranded about cable central member 10. The switchback points are marked on the jacket 21 with indicia such as 30 to indicate to the craftsperson where the cable should be opened for splicing purposes. If the method of the second embodiment is used, an intermediate mark 32 is applied on the core at each switchback point.

Alternative embodiments of the invention may also be used. As an alternative to the second embodiment, a metallic band instead of a color mark may be placed around each switchback point. An inductive proximity sensor then is substituted for the optical scan sensor. In another alternative to the second embodiment, an x-ray-opaque band replaces the color mark and an x-ray emitter and sensor is substituted for the optical scan sensor.

The invention may equivalently be practiced by employing a velocity measurement device instead of a length measurement device. The velocity measurement also sends encoder signals to the computer, which calculates a current distance based on measured average cable velocity and the formula distance equals velocity times time. Many modern capstans generate encoder signals that may be used to determine velocity or length. The capstan may be placed beyond a water trough in a jacketing line or beyond a binder station in a stranding line. The function of the computer may be performed by a programmable logic controller, which is considered to be a computer as the term is used in this application.

When the core is to be marked, the outermost core element may bear the marking indicia. The outermost core element may be the tubes 13, binder tape, strength members, water-swellable or water-absorptive elements such as waters-wellable tapes, or other outermost core elements, as dictated by the cable design. For simplicity of illustration, core elements surrounding tubes 13 are not shown in FIG. 7.

Other carriers of optical fibers, such as carriers shaped substantially as a "U" in cross-section, may be used instead of tubes 13, particularly if surrounded by other core elements.

It is to be understood that the invention is not limited to the exact details of the construction, operation, materials, or embodiments shown and described, as modifications and equivalents will be apparent to one skilled in the art without departing from the scope of the invention. For instance, merely adding a constant to the current length in both values compared by a comparator would be equivalent to the claimed invention.

What is claimed is:

1. In a method for marking an optical fiber cable sheath, the method comprising the steps of:
 (a) providing a moveable lay device, optical fiber carriers, and a central member;
 (b) moving the lay device to strand the carriers and to make carrier lay direction reversal points about the central member;

(c) generating carrier lay direction reversal information in response to reversing the direction of the lay device;

(d) locating a fix point at which the carrier lay direction reversal points are substantially established with respect to the central member;

(e) forming a sheath about the carriers and the central member;

(f) providing a sheath marker device operative to mark the sheath;

(g) measuring an offset distance, the offset distance being defined as a distance between the sheath marker device and the fix point;

(h) providing a measurement device which measures position data of the central member, the data indicating the current length passing a measurement point;

(i) responsive to the reversal information, entering into a memory the sum of the current length and the offset distance, and then comparing the sum to the current length; and (j) when the current length is equal to the sum, activating the marking device whereby the marking device marks the sheath.

2. The method of claim 1, wherein the measurement device comprises a speed measurement device, the speed measurement device determines the speed of the central member to determine the current length.

3. The method claim 1, wherein the measurement device comprises a length measurement device, the length measurement device determines the length of the central member to determine the current length of the cable.

4. The method of claim 1, wherein the mark on the sheath comprises a colored material.

5. The method of claim 1, wherein the mark on the sheath comprises a metallic material.

6. The method of claim 1, wherein the marking comprises a material which is cable of reflecting incident electromagnetic radiation.

7. In a method for marking a sheath of an optical fiber cable, the method comprising the steps of:

(a) providing a fiber optic cable core having reversal points and reversal point markings;

(b) providing a measurement device, the measurement device measures position data indicating the current length of the fiber optic cable core;

(c) providing a sensor device, the sensor device observes the reversal point markings on the core and generates reversal point marking information;

(d) forming a sheath about the fiber optic cable core;

(e) providing a sheath marker device, the sheath marker device is operative to mark the sheath;

(f) measuring an offset distance defined as the distance which separates the sheath marker device from the sensor device;

(g) responsive to the reversal point marking information, entering into a memory the sum of the current core length and the offset distance, and then comparing the sum to the current core length; and (h) when the current core length is equal to the sum, activating the marking device whereby the marking device marks the sheath at the reversal points.

8. The method of claim 7, wherein the sensor device comprises an optical detector optically scanning for the reversal point markings.

9. The method of claim 7, wherein the sensor device comprises a vision apparatus visually scanning for the reversal point.

10. The method of claim 7, wherein the measurement device comprises a speed measurement device, the speed measurement device determines the speed of the fiber optic cable core to determine the current length.

11. The method claim 7, wherein the measurement device comprises a length measurement device, the length measurement device determines the length of the fiber optic cable core to determine the current length.

12. The method of claim 7, wherein the cable core reversal point marking comprises a colored material.

13. The method of claim 7, wherein the cable core reversal point marking comprises a metallic material.

14. The method of claim 7, wherein the cable core reversal point marking comprises a material which is cable of reflecting incident electromagnetic radiation.

15. In a method for marking a fiber optic cable, comprising the steps of:

(a) monitoring a current length value of the cable;

(b) measuring an offset distance value;

(c) entering the offset distance value into a memory;

(d) making a lay direction reversal point;

(e) adding the current length value to the offset distance value to define a sum value;

(f) comparing the sum value to the current cable length value; and (g) when the sum value equals the current cable length value, activating the marking device.

\* \* \* \* \*